(12) United States Patent
Garren

(10) Patent No.: US 7,456,780 B1
(45) Date of Patent: Nov. 25, 2008

(54) METHOD AND SYSTEM FOR DEVELOPING AND USING AN IMAGE RECONSTRUCTION ALGORITHM FOR DETECTING AND IMAGING MOVING TARGETS

(75) Inventor: David Alan Garren, Fairfax, VA (US)

(73) Assignee: Science Applications International Corporation, San Diego, CA (US)

( * ) Notice: Subject to any disclaimer, the term of this patent is extended or adjusted under 35 U.S.C. 154(b) by 77 days.

(21) Appl. No.: 11/492,902

(22) Filed: Jul. 26, 2006

(51) Int. Cl.
*G01S 13/90* (2006.01)

(52) U.S. Cl. ............... 342/25 A; 342/25 B; 342/25 D; 342/25 E; 342/25 F; 342/160; 342/162; 342/115; 342/194; 342/195

(58) Field of Classification Search ............... 342/25 R, 342/25 A–25 F, 115, 159–162, 179, 180, 342/191, 194–197
See application file for complete search history.

(56) References Cited

U.S. PATENT DOCUMENTS

| | | | | |
|---|---|---|---|---|
| 3,178,711 | A * | 4/1965 | Case, Jr. ................... | 342/98 |
| 4,549,184 | A * | 10/1985 | Boles et al. ............... | 342/25 B |
| 4,963,877 | A * | 10/1990 | Wood et al. ............... | 342/25 A |
| 5,245,347 | A * | 9/1993 | Bonta et al. ................ | 342/149 |
| 6,646,593 | B1 | 11/2003 | Garren ....................... | 342/179 |
| 6,812,886 | B2 | 11/2004 | Garren ....................... | 342/179 |
| 6,911,933 | B1 | 6/2005 | Mutz et al. ................ | 342/25 B |
| 7,259,715 | B1 * | 8/2007 | Garren et al. .............. | 342/179 |
| 2004/0021598 | A1 * | 2/2004 | Garren ....................... | 342/25 |
| 2005/0179579 | A1 | 8/2005 | Pinder et al. .............. | 342/25 R |
| 2008/0095312 | A1 * | 4/2008 | Rodenburg et al. ........ | 378/87 |

OTHER PUBLICATIONS

Carrara, W. G., Goodman, R. S., Majewski, R. M., "Spotlight Synthetic Aperature Radar Signal Processing Algorithms," Artech House, Boston, 1995, pp. 238-243.
"Maritime Surveillance With Combined Use of Satellites and Aircraft," Swedish Space Corporation, Airborne Systems, 2 pp., Jun. 2004, http://www.ssc.se/data/content/DOCUMENTS/2004928210375178urv_by_Satellite_050603.pdf.
Legters, George R., "SCHISM: The Final Fortnight (Signal and Clutter as Highly Independent Structured Modes)," Knowledge-Aided Sensor Signal Processing and Expert Reasoning (KASSPER), DARPA, Special Projects Office, 24 pp., Feb. 22, 2005.
Barrie, Douglas, "Tornado GR4 Will Fly With Active E-SCAN Radar" [online], *Aviation Week & Space Technology*, Feb. 20, 2006 [retrieved on May 5, 2008], 33 pp., Retrieved from the Internet: http://aviationnow.printthis.clickability.com/pt/cpt?action+cpt &title=AWIN+DISPLAY+ARTICLE+PAGE . . . .
Perry, R. P., DiPietro, R. C., and Fante, R. L., "SAR Imaging of Moving Targets," IEEE Transactions on Aerospace and Electronic Systems, vol. 25, No. 1, Jan. 1999, pp. 188-200.

(Continued)

*Primary Examiner*—John B Sotomayor
(74) *Attorney, Agent, or Firm*—King & Spalding LLP

(57) ABSTRACT

Image reconstruction approaches that use standard Cartesian-sampled, frequency-domain SAR data, which can be collected by a platform with a single radar antenna, together with its associated metadata as the input and generate an output comprised of a set of images that show the directions of moving targets, estimates of their motions, and focused images of these moving targets.

20 Claims, 11 Drawing Sheets

OTHER PUBLICATIONS

Friedlander, B., and Porat, B., "VSAR: A High Resolution Radar System for Detection of Moving Targets," IEEE Proceedings on Radar, Sonar, and Navigation, vol. 144, No. 4, Aug. 1997, pp. 205-218.

Sharma, Gierull and Collins, "The Influence of Target Acceleration on Velocity Estimation in Dual-Channel SAR-GMTI," IEEE Transactions on Geoscience and Remote Sensing, vol. 44, Issue 1, Jan. 2006, http://ieeexplore.ieee.org/search/wrapper.jsp?arnumber=1564403.

Fulghum, David A, "British Morph Jet into Next-Generation Intelligence Platform" [online], *Aviation Week and Space Technology*, Feb. 6, 2006 [retrieved on May 5, 2008], 3 pp., Retrieved from the Internet: http://aviationnow.printthis.clickability.com/pt/cpt?action=cpt&title=A_WIN+DISPLAY+ARTICLE+PAGE . . . .

Morring, Frank, Jr., "U.S. Instruments on Indian Orbiter Seen Aiding Exploration" [online], *Aviation Week and Space Technology*, Mar. 20, 2006.[retrieved on May 5, 2008], 2 pp., Retrieved from the Internet: http://aviationnow.printthis.clickability.com/pt/cpt?action=cpt&title+A_WIN+DISPLAY+ARTICLE+PAGE . . . .

Murphy, Don, and Trivers, Geoff, "How Does IIP Detect North Atlantic Icebergs?"[onlibne], U.S. Coast Guard, International Ice Patrol, 1993 [retrieved on May 5, 2008], 6 pp., Retrieved from the Internet: http://www.uscg.mil/LANTAREA/IIP/FAQ/ReconnOp_10.shtml.

Goebel, Greg, "Modern Radar Technology" [online], Jan. 1, 2005 [retrieved on May 5, 2008], 13 pp., Retrieved from the Internet: http://www.vectorsite.net/ttradar3.html.

Mendelson, Howard, "STAP Processing Techniques For Advanced SAR GMTI" [online], Jan. 1. 2005 [retrieved on May 5, 2008], 2003 [retrieved on May 10, 2007], 1 p., Retrieved from the Internet: http://mathpost.1a.asu.edu/~wopperer/mendelsonabs.html.

Dunn, Richard J., III, et al., "Ground Moving Target Indicator Radar and the Transformation of U.S. Warfighting," Northrop Grumman, 18 pp. Feb. 2004, http://www.analysiscenter.northropgrumman.com/files/gmti.pdf.

"JSTARS Joint Surveillance and Target Attack Radar System, USA" [online], Copyright 2007 [retrieved on May 10, 2007], 3 pp., Retrieved from the Internet: http://www.airforce-technology.com/projects/jstars/.

"Radar: Modular Airborne Systems" [online], EDO Corporation, Copyright 2007 [retrieved on May 10, 2007], 2 pp., Retrieved from the Internet: http://www.edocorp.com/RadarAirborne.htm.

Guo, Hanwei, et al., "Detection of Invisible Moving Targets in Foliage Penetration Ultra-Wide-Band Synthetic Aperature Radar Images" [online], 2003 [retrieved on May 10, 2007], 2 pp., Retrieved from the Internet: http://spiedl.aip.org/getabs/servlet/GetabsServlet?prog=normal&id=OPEGAR000042000010002796000001&idtype=cvips&gifs=yes.

Sanyal, P. K., et al., "Detecting Moving Targets in SAR Via Keystoning and Multiple Phase Center Interferometry" [online], Feb. 2006 [retrieved on May 10, 2007], 1 p., Retrieved from the Internet: http://www.mitre.org/work/tech_papers/tech_papers_06/06_0142/.

Sikaneta, I., et al., "Two-Channel SAR Ground Moving Target Indication for Traffic Monitoring in Urban Terrain" [online], In: *Stilla U. Rottensteiner F. Hinz S (Eds.) CMRT05, IAPRS*, vol. XXXVI, Part 3/W24, Vienna, Austria, Aug. 29-30, 2005 [retrieved on May 5, 2008], pp. 95-101, Retrieved from the Internet: http://www.commission3.isprs.org/cmrt05/papers/CMRT05_Sikaneta_Gierull.pdf.

"Ground Moving Target Indication Surveillance Radar (GMTI)" [online], Copyright 2005 [retrieved on May 10, 2007], 3 pp., Retrieved from the Internet: http://www.ottawa.drdc-rd_dc.gc.ca/html/RS-215-gmti_e.html.

"Sandia Synthetic Aperature Radar Programs"[online], Copyright 2005 [retrieved on May 10, 2007], 2 pp., Retrieved from the Internet: http://www.sandia.gov/RADAR/programs.html.

Wang, Genyuan, et al., "Radar Imaging of Moving Target in Foliage in Using Multifrequency Multiaperture Polarimetric SAR," *IEEE Transactions on Geoscience and Remote Sensing*, vol. 41, No. 8, pp. 1755-1764, Aug. 2003.

"Search and Rescue Group Uses Sandia Synthetic Aperture Radar" [online], Aug. 10, 2004 [retrieved on May 10, 2007], 3 pp., Retrieved from the Internet: http://www.sandia.gov/news/resources/releases/2004/elect-semi-sensors/rescue.html.

Smith, Laurence, "Emerging Applications of Interferometric Synthetic Aperture Radar (InSAR) in Geomorphology and Hydrology," *Annals of the Association of American Geographers*, 92(3), pp. 385-398, 2002.

Stilla, U., et al., "Airborne Monitoring of Vehicle Activity in Urban Areas" [online], [retrieved on May 5, 2008], 7 pp., Retrieved from the Internet: http://www.isprs.org/istanbul2004/comm3/papers/410.pdf.

"Homeland Security: Unmanned Aerial Vehicles and Border Surveillance" [online], CRS Report for Congress, Updated Feb. 7, 2005 [retrieved on May 5, 2008], 6 pp., Retrieved from the Internet: http://www.fas.org/sgp/crs/homesec/RS21698.pdf.

"Advanced Guidance Division (AFRL/MNG)" [online], [retrieved on May 5, 2008], 3 pp., Retrieved from the Internet: http://www.mn.afrl.af.mil/public/advguid.html.

"Search and Rescue Synthetic Aperture Radar ($SAR^2$)" [online], [retrieved on May 5, 2008], 2 pp., Retrieved from the Internet: http://web.archive.org/web/20060103151047/http://searchandrescue.gsfc.nasa.gov/techdevelopment/sar2.html.

"Sensor ATR Technology Division (SNA)" [online], [retrieved on May 8, 2008], 1 p., Retrieved from the Internet: http://web.archive.org/web/20040815002613/http://www.sn.afrl.af.mil/pages/SNA/sensor_atr_technology_division.htm.

* cited by examiner

METHOD AND SYSTEM FOR DEVELOPING AND USING AN IMAGE RECONSTRUCTION ALGORITHM FOR DETECTING AND IMAGING MOVING TARGETS

The U.S. Government may have a paid-up license in this invention and may have the right in limited circumstances to require the patent owner to license others on reasonable terms as provided for by the terms of a U.S. Government contract.

BACKGROUND OF THE INVENTION

1. Field of the Invention

Generally, the invention involves a process for forming radar images. More specifically, the invention involves a process for detecting moving targets and for forming focused radar images of moving targets.

2. Description of the Related Art

Radar, at its most basic application, is used to measure the range to a target. With knowledge of the speed of propagation of the wave, i.e., electromagnetic wave, that is transmitted toward the target, it is possible to resolve in a first dimension, the distance to the target, based on the received reflected wave or echo. In order to use radar as an imaging tool, it is necessary to collect information about the cross-range of the target, in addition to the first dimension information. This cross-range information is about a second dimension perpendicular to the first dimension.

Synthetic aperture radar (SAR) can be used to collect data in both the first and second dimensions, through a process wherein the reflected waves are measured at different angles with respect to an object-of-interest. This process is referred to in the art as collecting radar measurements over a synthetic (as opposed to a literal) aperture. By taking various measurements of the object-of-interest from varying aspect angles, it is possible to determine approximate distance to the scattering centers within an object-of-interest in the first dimension and location of these scattering centers within the object-of-interest in the second, cross-range dimension. This process of two-dimensional imaging is commonly referred to as reflection tomography.

SAR systems take advantage of the long-range propagation characteristics of radar signals and the complex information processing capability of modern digital electronics to provide high-resolution imagery. SAR imaging is not restricted by time of day or atmospheric conditions due to its operative frequencies. Consequently, SAR imaging supplements other photographic and optical imaging techniques in order to facilitate environmental monitoring, earth-resource mapping, and military operations which may require broad-area imaging at high resolutions. More specifically, SAR technology provides detailed terrain information to geologists for mineral exploration, environmentalists for determination of oil spill boundaries, navigators for sea state and ice hazard mapping, and the military for reconnaissance and targeting information.

Other systems using reflection data, also referred to as projection measurements, are police radars for vehicle speed monitoring and detection, fault inspection systems using acoustic imaging, submarine sonar for imaging underwater objects and the like, seismic imaging system for tunnel detection, oil exploration, geological surveys, etc., and medical diagnostic tools such as sonograms and echocardiograms.

There have been two basic types of processing techniques used in the field of reflection tomography to reconstruct single-bounce (SB) reflection data. First, the frequency-domain projection-slice theorem takes the measured phase history from the reflection data taken at different aspect angles and generates the reconstruction of an image using Fourier transforms. This reconstruction technique is often used for reconstructing SAR image data in order to minimize the computational load that results from necessarily complex processing. A second technique, more prevalent in the medical imaging community, is based on the time-domain back projection techniques. Both of these techniques are discussed in U.S. Pat. No. 5,805,098 to McCorkle which is incorporated herein by reference in its entirety.

An image reconstruction algorithm designed to detect and extract multiple bounce scattering effects on image formation is described in U.S. patent application Ser. No. 10/954,218 entitled PROCESS FOR MAPPING MULTIPLE-BOUNCE GHOSTING ARTIFACTS FROM RADAR IMAGING DATA" filed Oct. 1, 2004 which is a continuation of U.S. patent application Ser. No. 10/631,712 entitled PROCESS FOR MAPPING MULTIPLE-BOUNCE GHOSTING ARTIFACTS FROM RADAR IMAGING DATA" which claims priority to U.S. Pat. No. 6,646,593 similarly titled, which claims priority to U.S. Provisional Patent Application No. 60/345,639, entitled "SPOTLIGHT SAR IMAGE FORMATION WITHOUT MULTIPLE-BOUNCE GHOSTING ARTIFACTS" filed Jan. 8, 2002, all of which are incorporated herein by reference in their entirety.

The reflection data processing techniques described in the related art described herein assume that the impinging wave reflects off of an object of interest that is stationary within the scene of interest before returning back to the receiver. This assumption neglects the situation wherein the wave actually reflects off of a target or object of interest that changes its location within the scene as the sensor is collecting the data used for image reconstruction.

In prior art directed at the task of detecting and imaging moving targets, Perry et al., "SAR Imaging of Moving Targets," IEEE Aerospace and Electronic Systems, Vol. 35, No. 1, 1999, pp. 188-200, developed a technique for performing SAR imaging of moving targets based upon techniques that are similar to that of conventional moving target indication (MTI) techniques applied to SAR data. In particular, these authors argue that "standard techniques, such as CFAR (constant false alarm rate) detection prescreening may be used to isolate both the static and moving targets from the scene." They further claim that "this is more difficult for the unfocused movers because they are smeared more than static targets and hence require a larger target-to-clutter ratio for good detection at reasonable false alarm rates." Thus, these techniques effectively separate the moving targets from the stationary clutter prior to the processing used to actually focus well-formed images of the moving targets. Perry et al. claim "this approach does work, however, for sparse nonurban scenes" as exemplified by their good results for isolated vehicles on a desert road in China Lake, Calif. However, this prior art does not offer such claims of success in more challenging urban environments that typically have a much higher level of stationary clutter. They further claim that the use of "a zero-Doppler clutter filtering technique, such as DPCA (displaced phase center antenna)" can be used to improve the pre-detection of moving targets. However, DPCA requires the platform to have multiple radar antennas.

Other techniques for separating moving targets from SAR data, such as are described in Friedlander et al., "VSAR: A High Resolution Radar System for Detection of Moving Targets," IEE Proceedings on Radar, Sonar, and Navigation, Vol. 144, No. 4, August 1997, pp. 205-218, are also known. However, these methods require that the platform possess multiple radar antennas.

Other prior art approaches that use conventional SAR data to estimate the locations and velocities of surface targets moving in an arbitrary direction are highly dependent on scene context and, furthermore, require a high level of human interaction to yield viable results. See Carrara et al. "Spotlight Synthetic Aperture Radar-Signal Processing Algorithms," Artech House, Boston, 1995, pp. 238-241. In particular, the required contextual information is that of a road network. Through use of intensive human analysis and a good SAR simulation tool, it is possible to estimate target location and velocity based on the existence of a cross-range streak in conventional SAR imagery. These approaches use a trial-and-error approach wherein a human analyst performs the following steps: 1) modeling the forward problem, wherein scene context is used to make an initial hypothesis for the location and trajectory of a surface moving target within the scene; 2) using a SAR simulator to analyze the streak signature arising in a conventional SAR image due to the hypothesized moving target; 3) comparing the results of the simulation with the actual measured SAR image; 4) using this comparison to refine the hypothesis of the target location and trajectory; 5) iterating until the human analyst is satisfied with the correlation between the simulated streak signature and the that of the actual measured data; and 6) applying this procedure to the next candidate moving target in the original SAR image, as evidenced by the existence of a cross-range streak in the image. This approach is human-intensive and typically requires auxiliary road network information to yield correct estimates the locations and trajectories of surface moving targets using SAR data. However, such techniques often yield ambiguous results, as there are typically many different roads on which any particular target may be moving and which may give rise to identical signature streaks in the conventional SAR image. Furthermore, certain types of contextual information, e.g. road network information) may not be reliable for many tactical targets, e.g. tanks, because such vehicles are not typically constrained to travel on road networks.

SUMMARY OF THE INVENTION

Summary of the Problem

As discussed above, prior art approaches to detecting and imaging moving targets in conventional SAR imagery suffer various limitations, such as being applicable only to targets moving slowly in the cross-range dimension, requiring multiple antennas, or relying heavily on contextual information and human interaction. These facts motivate the need for the development of a modified image formation process that detects and images moving targets without these limitations.

Summary of the Solution

Described herein are image reconstruction approaches that use standard Cartesian-sampled, frequency-domain SAR data, which can be collected by a platform with a single radar antenna, together with its associated metadata as the input and generate an output comprised of a set of images that show the directions of moving targets, estimates of their motions, and focused images of these moving targets.

In one embodiment of the invention, five basic processing steps implemented together give significant gains over simpler approaches that omit one or more of the steps:

1) Decompose the original Cartesian-sampled, frequency-domain SAR data into some number N of subapertures (possibly overlapping) in the "slow-time" or aperture dimension;

2) Select some number M of candidate target motions $v_m$ (m=1, . . . , M) having components in both the down-range radar direction and the cross-range radar direction (and possibly the elevation direction), where these components may be further characterized by one or more parameters (such as velocity, acceleration, etc.);

3) For each value of the N subaperture data sets combined with each value of the candidate target motion $v_m$, form a "motion-focused" subaperture image that is obtained by including additional phase factors into the input Cartesian-sampled, frequency-domain data to obtain a well-focused SAR magnitude image for all surface targets moving with the candidate motion $v_m$;

4) For each value of the candidate motion $v_m$, use the N different motion-focused images as input into an algorithm that jointly computes balanced estimates of the motion-focused subaperture image, which ideally contains only objects moving with motion $v_m$, and the "stationary-defocused" image. This part of the approach utilizes the fact that within the input motion-focused subaperture images, the defocused stationary clutter exhibits a predictable drift with regard to the subaperture index n=1, . . . , N, whereas objects moving with motion $v_m$ do not exhibit such drift. This signature difference is exploited to jointly estimate idealized images of the focused objects moving according to motion $v_m$ and the defocused stationary clutter; and 5) The resulting subaperture image estimates of the motion-focused targets and the defocused stationary clutter are used to make binary detection decisions regarding whether potential targets moving according to motion $v_m$ present in the image. The value of the assumed candidate motion $v_m$ is then used to assign an estimate for the motion of each detected target. The motion-focused subaperture images of the detected targets yield focused images that are similar in appearance to images that would result if these same targets were actually stationary rather than moving within a conventional SAR image.

A further embodiment of the invention is a process for detecting a moving target and reconstructing a scene with a moving target from scattering data, said process comprising: collecting an image of a scene, the image containing scattering data from the scene representing (a) stationary scatterer reflection data and (b) moving scatterer reflection data. The process further includes decomposing said scattering data into a plurality of subsets of scattering data; choosing a plurality of candidate motions; and forming for each pairwise combination of each said subset of scattering data with each said candidate motion a target-focused subimage, wherein said target-focused subimage is focused according to said candidate motion.

For each said candidate motion, the process includes using a plurality of said target-focused subimages focused according to said candidate motion to form joint balanced estimates of (1) a focused subimage containing only scatterers moving with said candidate motion and (2) a defocused image containing only stationary scatterers.

In an embodiment, the data are collected using inverse synthetic aperture radar or related methods wherein the transmitter/receiver locations are stationary during the measurements of the reflected echoes, as with one possible mode of police radars used for vehicle speed detection and monitoring.

In another embodiment, the scattering data are collected based upon the general principles of reflection tomography, as with the monitoring of blood flow using medical ultrasound technology.

In a further embodiment, the estimates of moving entities include two or three components of the entity velocity, as with the estimate of two or three velocity components of blood flow using medical ultrasound technology.

The process further includes using said estimate of the focused subimage containing only scatterers moving with said candidate motion and said estimate of the defocused image containing only stationary scatterers to make a binary decision with regard to the presence or absence of a target moving with said candidate motion.

As one of ordinary skill in the art will recognize, various algorithms may be formulated to implement processing based on the methodology outlined above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the Figures.

DETAILED DESCRIPTION OF THE PREFERRED EMBODIMENTS OF THE PRESENT INVENTION

Figure 1A:
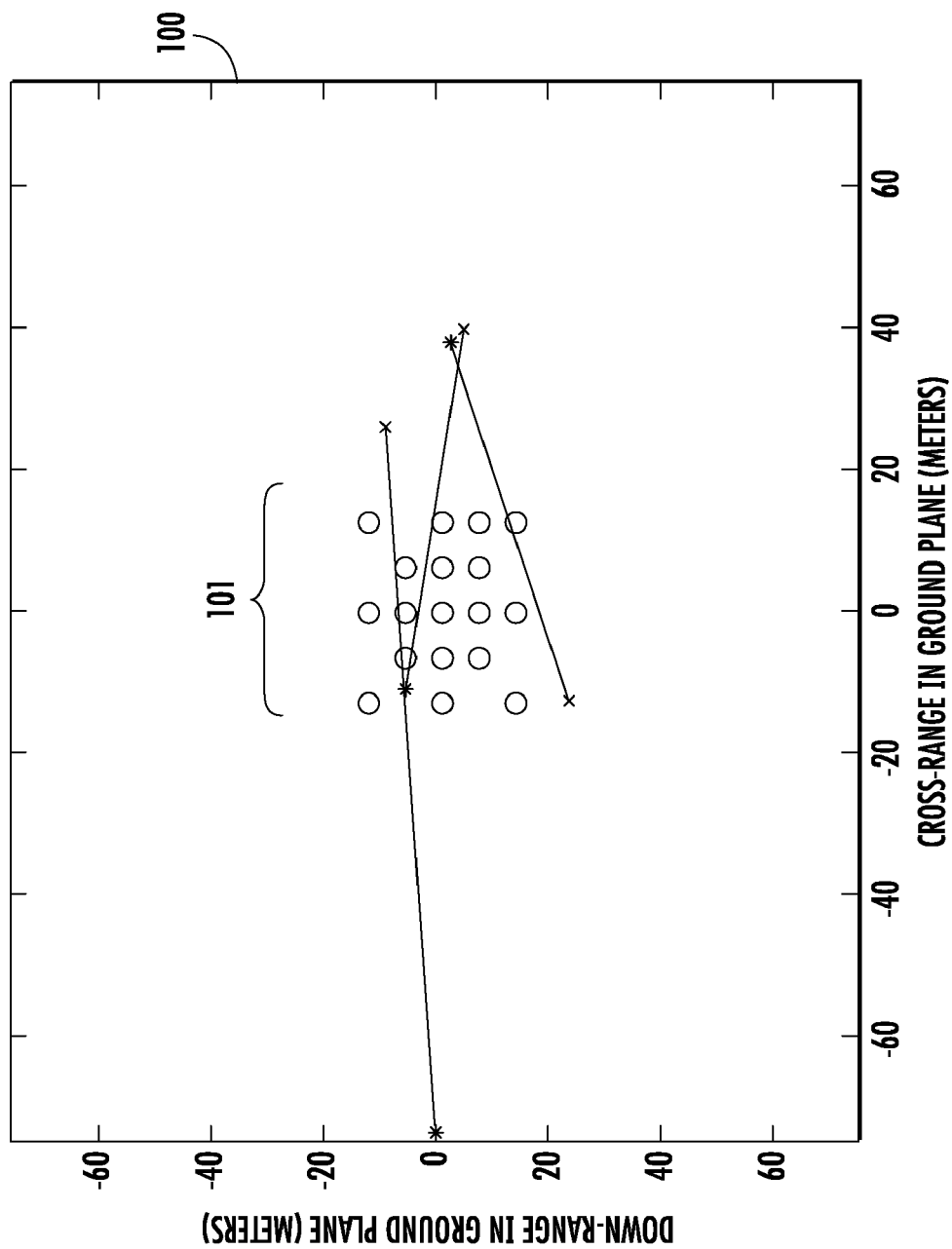
FIG. 1a illustrates true scattering point data from multiple moving and stationary targets according to embodiments of the present invention.

According to an embodiment of the present invention, the detection and imaging of moving targets may be obtained by taking into account candidate target motions through application of an algorithm for moving target estimation via synthetic aperture radar (MESAR). The moving target detection and image reconstruction process begins with complex-valued SAR data in the frequency domain. Such data retains the phase content of the scene reflectivity and is obtained via transmitter and receiver configurations (not shown) that are well-known in the art. The data is processed according to MESAR via a processor (not shown). Processors are well-known in the art and will not be discussed further herein. If the data are provided in the complex-valued image domain, then any existing sidelobe weighting should be removed prior to application of a two-dimensional Fourier transform to obtain Cartesian-resampled frequency domain data (hereinafter "complex Cartesian data"). One of ordinary skill in the art knows how to implement a two-dimensional Fourier transform on complex image data as well as remove sidelobe weighting from that data, hence the details are not included here. In addition, one of ordinary skill in the art also knows how to apply sensor motion compensation and autofocus processes to SAR data, and these processes are assumed to have been applied prior to obtaining the complex Cartesian data.

Let $G(\xi_m, \eta_n)$ denote the complex Cartesian data in terms of M discrete resampled values of the down-range spatial frequency $\xi_m$ and $N_f$ discrete resample values of the cross-range spatial frequency $\eta_n$ (here the subscript f refers to the original full aperture). The first step in the processing under this embodiment is to use the original full cross-range aperture in order to form a reduced aperture that is smaller than the full aperture. Such a strategy can be beneficial if moving vehicles in the scene exhibit highly non-linear motion over the temporal duration of the full aperture. Let the integer $N_r < N_f$ denote the number of discrete values of the cross-range spatial frequency $\eta$ for this reduced aperture. Here, the subscript r refers to the reduced aperture.

Given the complex-valued, Cartesian resampled, frequency-domain data $G_r(\xi_m, \eta_n)$, which contains $N_r$ samples in the cross-range spatial frequency direction, the approach of this embodiment further selects still smaller subapertures in terms of the cross-range frequency dimension. Select S equally-spaced and overlapping subapertures within each of the reduced subapertures, and let N (where $N < N_r$) denote the number of samples in the cross-range spatial frequency for each of the S subapertures. This segments the original frequency-domain data $G(\xi_m, \eta_n)$, with m=1, . . . , M and n= 1, . . . , $N_f$, into a number of smaller and probably overlapping data sets denoted $G_s(\xi_m, \eta_n)$ in terms of the subaperture index s, with m=1, . . . , M and n=1, . . . , N.

Before processing the subaperture data sets, it is necessary to select the candidate target motions, which describe the target motion in both the radar down-range and radar cross-range directions, along with a possible motion component in the elevation direction. For illustration purposes, assume that the target motion in the elevation direction is negligible. One versed in the art could modify the processing below in order to include target motions in the elevation direction, as well.

In the processing under one embodiment of the invention, parameterize the target velocities in terms of time t to obtain the following down-range $\tilde{x}$ and cross-range $\tilde{y}$ positional components:

$$\tilde{x}(t) = x_0 + u_0 t + \frac{1}{2} a_x t^2, \qquad (1)$$

$$\tilde{y}(t) = y_0 + v_0 t + \frac{1}{2} a_y t^2. \qquad (2)$$

Here the constants $x_1$ and $y_1$ denote the average position of the moving target in the down-range and cross-range directions, respectively, during the coherent processing time of the synthetic aperture. The parameters $u_0$ and $v_0$ determine the vehicle velocity, and the parameters $a_x$ and $a_y$ determine the acceleration. The time t is assumed to vary between $-T_0/2$ and $T_0/2$. This analysis can easily be extended to include higher order motion effects, such as the $t^3$-order "jerk" motion term. However, such a more complete motion parameterization typically incurs a higher computational burden.

The processing under one embodiment of the invention searches for moving vehicles having some finite number of candidate motion parameter sets characterized by the parameters $(u_k, v_k, a_{x,k}, a_{y,k})$, with k=1, . . . , K, with K equal to the total number of candidate velocities. In principle, there is no restriction on the grid of candidate parameter sets. A relatively simple configuration is to define a set of equally-spaced candidate velocities and equally-spaced accelerations on a Cartesian grid in a parameterized velocity-acceleration space. However, it also possible to select candidate motion parameter sets on a non-rectangular grid, for example a grid representing a logarithmic distribution of speeds.

It is necessary to determine the signatures of moving vehicles within SAR images. The goal is to perform this characterization in terms of variables that are convenient for ingesting complex-valued SAR images. To perform this calculation, begin with the following model of the down-converted SAR measurement data:

$$G(f, t) = \sum_l \sigma_l \exp(-j2\pi\{R(\theta(t), \varphi(t)) - R_0(\theta(t), \varphi(t))\}2f/c) \quad (3)$$

with θ(t) and φ(t) equal to the platform azimuth and elevation angles, respectively, relative to ground plane coordinates. In equation (3), $R(\theta(t),\phi(t))$ is equal to the range from the platform to the $l^{th}$ scatterer characterized by complex-valued reflectivity $\sigma_l$, and $R_0(\theta(t),\phi(t))$ is the range from the platform to the selected ground reference point (GRP) for spotlight SAR image formation. Note that although these equations are presented for spotlight SAR image formation, one versed in the art could modify the equations to accommodate other SAR imaging modes, including stripmap and scan.

The instantaneous difference between R and $R_0$ for the $l^{th}$ scatterer is equal to the projective range from the scatterer to the GRP. This distance can be expressed in the form:

$$r(\theta(t),\phi(t)) = R(\theta(t),\phi(t)) - R_0(\theta(t),\phi(t)) = \tilde{x}_l(t)\cos(\theta(t))\cos(\phi(t)) + \tilde{y}_l(t)\cos(\theta(t))\cos(\phi(t)) \quad (4)$$

for wavefronts that are approximately planar at the GRP. It is useful to define a projection of the spatial frequency relative to the projective range via $$\rho \equiv \frac{2f}{c}. \quad (5)$$

The down-converted SAR measurements now have the form $$G(\rho, t) = \sum_l \sigma_l \exp(-j2\pi\{\tilde{x}_l(t)\cos(\theta(t))\cos(\varphi(t)) + \tilde{y}_l(t)\sin(\theta(t))\cos(\varphi(t))\}\rho) \quad (6)$$

Equation (6) has a form that facilitates transformation from the spherical spatial frequency domain $(\rho,\theta,\phi)$ to the Cartesian spatial frequency domain via the transformation:

$$\xi(t) = \rho \cos(\theta(t))\cos(\phi(t)), \quad (7)$$

$$\eta(t) = \rho \cos(\theta(t))\sin(\phi(t)), \quad (8)$$

with ξ(t) equal to the down-range spatial frequency, and η(t) equal to the cross-range spatial frequency. Thus, the expression for the idealized SAR phase-history measurements has the form:

$$G(f, t) \to \tilde{G}(\xi, \eta, t) = \sum_l \sigma_l \exp(-j2\pi\{\tilde{x}_l(t)\xi(t) + y_l(t)\eta(t)\}) \quad (9)$$

The computation of the subaperture SAR images can be performed by evaluating the following expression:

$$b_s(x, y) = \int_{\xi_f - \Delta\xi/2}^{\xi_f + \Delta\xi/2} d\xi \int_{\eta_s - \Delta\eta/2}^{\eta_2 + \Delta\eta/2} d\eta \tilde{G}(\xi, \eta, t) \exp(j2\pi(x\xi + y\eta)) \quad (10)$$

with s equal to the subaperture index, and $\eta_s$ equal to the central cross-range spatial frequency corresponding to subaperture s. A predictive evaluation of equation (10) requires knowledge of the value of the slow-time t for every sample value of the spatial frequency coordinates (ξ,η). In order to perform this calculation, it is useful to parameterize the platform trajectory.

In one embodiment of the invention, a viable parameterization of the platform trajectory is the following in terms of the ground-plane coordinates $(X_0,Y_0,Z_0)$:

$$X(t) = \pm V_0 t \sin(\theta_g)\cos(\lambda) - X_0, \quad (11)$$

$$Y(t) = \pm V_0 t \cos(\theta_g)\cos(\lambda), \quad (12)$$

$$Z(t) = V_0 t \sin(\lambda) + Z_0, \quad (13)$$

with $V_0$ equal to the platform speed, λ equal to the platform pitch angle relative to level flight, $\theta_g$ equal to the platform ground-plane squint angle, $X_0$ equal to the platform ground range relative to the platform aperture center, and $Z_0$ equal to the platform elevation above the ground plane. The positive sign denotes platform movement in the +y direction, and a minus sign denotes movement in the −y direction.

The aspect angle θ in the spatial domain of the ground-plane coordinates $(X_0,Y_0,Z_0)$ is identical to that of the spatial frequency coordinates (ξ,η,ζ), with ζ equal to the spatial frequency in the elevation direction. Thus the tangent of the aspect angle can be expressed in dual form:

$$\tan(\theta(t)) = \frac{Y(t)}{X(t)} = \frac{\eta}{\xi}. \quad (14)$$

Equation (14) can be used to solve for the slow-time t in terms of the spatial frequency coordinates (ξ,η) and platform geometrical variables via:

$$t = \mp \frac{X_0}{V_0 \cos(\lambda)\cos(\theta_g)} \frac{\eta}{\{\xi - \eta\tan(\theta_g)\}}. \quad (15)$$

This expression for the slow-time is used in equation (10) to compute subaperture images corresponding to an ideal point target modeled in equations (1) and (2).

The evaluation for the subaperture images $b_s(x,y)$ in equation (10) continues in this embodiment by reworking the integral in terms of "centered" spatial frequencies defined by:

$$\bar{\xi} = \xi - \xi_f, \quad (16)$$

$$\bar{\eta} = \eta - \eta_s. \quad (17)$$

The subaperture image equation (10) becomes $$b_s(x, y) = \sigma_0 \int_{-\Delta\xi/2}^{\Delta\xi/2} d\tilde{\xi} \int_{-\Delta\eta/2}^{\Delta\eta/2} d\tilde{\eta} \exp(j2\pi\Omega), \tag{18}$$

in terms of the phase defined by $$\Omega \equiv \left(x - x_0 - u_0 t - \frac{1}{2}a_x t^2\right)(\xi_f + \tilde{\xi}) + \left(y - y_0 - v_0 t - \frac{1}{2}a_y t^2\right)(\eta_s + \tilde{\eta}), \tag{19}$$

using equations (1), (2), and (9), with the slow-time t determined by equation (15). For further understanding, it is useful to examine a Taylor series expansion of the terms in equation (18) in terms of three dimensionless parameters that are typically small for narrow-band SAR image formation:

$$\varepsilon_x \equiv \frac{\tilde{\xi}}{\xi_f}, \tag{20}$$

$$\varepsilon_y \equiv \frac{\tilde{\eta}}{\xi_f}, \tag{21}$$

$$\varepsilon_s \equiv \frac{\eta_s}{\xi_f}. \tag{22}$$

The third parameter is often smaller that the other two for the case of subapertures that are a relatively large fractional size of the full aperture, since there is a relatively small span of possible values for $\eta_s$ for this case.

Further analysis of the subaperture image equation (18) requires evaluation of the phase in equation (19) through at least second order in the two-dimensional Taylor series expansion in terms of $(\epsilon_x, \epsilon_y)$ to assess the signature characteristics of moving scatterers within the SAR imagery. The linear terms will be seen to affect the drift of each mover with regard to subaperture, and the quadratic terms will be seen to affect the focus of each mover. The Taylor series expansion reveals the following for the phase of equation (19):

$$\begin{aligned}\Omega\{x-x_0\}\xi_f + \{\{y-y_0\}\xi_f - ku_0\}\epsilon_s - k\{v_0+\alpha_0\}\epsilon_s^2 - k\beta_0\epsilon_s^3 + \\ \{\{x-x_0\}\xi_f + k\{v_0-\alpha_0\}\epsilon_s^2\}\epsilon_x + \{\{y-y_0\}\xi_f - ku_0 - \\ 2k\{v_0+\alpha_0\}\epsilon_s - 3\,k\beta_0\epsilon_s^2\}\epsilon_y + ku_0\epsilon_s\epsilon_x^2 + 2k\{v_0 - \\ \alpha_0\}\epsilon_s\epsilon_x\epsilon_y - k\{v_0+\alpha_0+3\beta_0\epsilon_s\}\epsilon_y^2,\end{aligned} \tag{23}$$

in terms of the parameters $$\alpha_0 \equiv u_0 \tan(\theta_g) + \frac{ka_x}{2\xi_f}, \tag{24}$$

$$\beta_0 \equiv v_0 \tan(\theta_g) + \frac{ka_y}{2\xi_f}, \tag{25}$$

and the geometry-dependent constant $$k \equiv \mp \frac{X_0 \xi_f}{V_0 \cos(\lambda) \cos(\theta_g)}. \tag{26}$$

The maximum intensity of the subaperture SAR images of equation (18) occurs for the position values (x,y) such that the coefficients of $\epsilon_x$ and $\epsilon_y$ in equation (23) vanish, giving:

$$x = x_0 + \frac{k}{\xi_f}\{v_0 - \alpha_0\}\varepsilon_s^2, \tag{27}$$

$$y = y_0 + \frac{k}{\xi_f}\{u_0 + 2\{v_0 + \alpha_0\}\varepsilon_s + 3\beta_0\varepsilon_s^2\}. \tag{28}$$

That is, the signature of a moving scatterer characterized by motion parameters $(u_0, v_0, a_x, a_y)$ drifts relative to the background of the stationary scatterers with regard to the subaperture center cross-range frequency $\eta_s$ according to equations (27) and (28). This difference in the drift signature between moving and stationary scatterers may be exploited in the processing of this embodiment of the invention. Of course, equations (27) and (28) can be Taylor expanded through arbitrarily high order in the dimensionless subaperture parameter $\epsilon_s$ if higher accuracy is required. One versed in the art could perform this expansion to arbitrarily high order.

The processing of this embodiment now searches for targets characterized by one of the candidate motion parameters $(u_k, v_k, a_{x,k}, a_{y,k})$, using the S different subapertures. It is first desirable to introduce a focusing term into the frequency-domain data sets of the S subapertures, so as to increase the peak scattering energy of targets that are actually moving with a motion that is determined by the parameters $(u_k, v_k, a_{x,k}, a_{y,k})$ within the corresponding subaperture images. An additional benefit of such a quadratic focusing term is that the stationary scatterers become defocused in the resulting subaperture images, so that the peak scattering energy of strong stationary scatterers (e.g. trihedrals) is actually reduced. These two effects contrive to increase the image intensities of targets moving with the candidate motion and to decrease the image intensities of stationary clutter, thereby increasing the effective signal-to-noise ratio of the moving targets of interest The implementation of the motion-based pre-focusing of the subaperture images is determined by the quadratic phase terms in equation (23) that are proportional to $\epsilon_x^2$, $\epsilon_x\epsilon_y$, and $\epsilon_y^2$. The pre-focusing can be accomplished by including additional factors in the subaperture image formation that exactly cancel these quadratic phase terms for the candidate motion parameter set under consideration. Analysis of equation (19) shows that this desired motion-based pre-focusing can be accomplished by including the following factor in the subaperture image formation:

$$\hat{\Omega} \equiv \exp\biggl(j2\pi\Bigl\{\hat{u}_0 t\{\xi_f + \tilde{\xi}\} + \hat{v}_0 t\{\eta_s + \tilde{\eta}\} + \frac{1}{2}\hat{a}_x t^2\{\xi_f + \tilde{\xi}\} + \frac{1}{2}\hat{a}_y t^2\{\eta_s + \tilde{\eta}\}\Bigr\}\biggr). \tag{29}$$

with the slow-time t again determined by Equation (15). In addition, it is useful to include the following phase term that is designed to retain the cross-range offset that is due to the down-range velocity:

$$\hat{\Omega}_{offset} \equiv \exp\biggl(j2\pi\biggl\{-\frac{k\hat{u}_0}{\xi_f}\{\eta_s + \tilde{\eta}\}\biggr\}\biggr). \tag{30}$$

Once $\hat{u}_0$ is determined accurately and any residual multiple detections of the same moving vehicle are culled, this cross-range offset can be simply corrected by relocating the detection by the cross-range distance $$y_{offset} \equiv \frac{k\hat{u}_0}{\xi_f} \tag{31}$$

to the vehicle's approximate true location.

In summarizing the image refocusing process, the desired focusing in the subaperture images can be obtained by replacing each of the frequency-domain samples of $G_s(\xi_m, \eta_n)$ with the following:

$$G_{s,k}(\xi_m, \eta_n) = G_s(\xi_m, \eta_n) \exp(j2\pi\hat{\Omega}), \tag{32}$$

in the formation of the focused subaperture images used to search for targets with candidate motion parameters $(u_k,v_k,a_{x,k},a_{y,k})$. Equation (29) has the additional result of offsetting the subaperture drift of scatterers moving with the candidate motion parameters. However, instead each of the defocused stationary scatterers had this same subaperture drift, but in the opposite direction relative to the mover drift in the unfocused subaperture images.

It should be noted that equation (29) can be extended easily to arbitrarily high orders in terms of the parameterized vehicle motion. Consider that the parameterized vehicle motion equations (1) and (2) can be placed in generic form $$\tilde{x}(t) = \sum_{l=0}^{L_x} \frac{1}{l!} \mu_l t^l, \tag{33}$$

$$\tilde{y}(t) = \sum_{m=0}^{L_y} \frac{1}{m!} v_m t^m, \tag{34}$$

with the expansion order integers $L_x$ and $L_y$ permitted to be large but finite. Then the desired focusing factor of Equation (9) is replaced by $$\hat{\Omega}_0 = \exp(j2\pi\{\tilde{x}(t)\{\xi_f+\xi\}+\tilde{y}(t)\{\eta_s+\eta\}\}), \tag{35}$$

with the slow-time t again determined by Equation (15).

The motion-focused subaperture images have the desired qualities that any target within the scene that is characterized by a given set of candidate motion parameters $(u_k,v_k,a_{x,k},a_{y,k})$ will be well-focused and offset to a location that is invariant with regard to the subaperture index s and lies at the approximate true target location within the scene. An additional benefit is that the scattering energy of the stationary clutter within these target-focused subaperture images is defocused and actually shifts within the imagery in a predictable direction with regard to the subaperture index s, as described below. Thus, the desired moving targets become strongly focused and invariant with regard to subaperture s, whereas the undesired stationary clutter becomes defocused and shifts with regard to subaperture index s. Therefore, the effective signal-to-noise ratio of all moving targets having the candidate motion parameters $(u_k,v_k,a_{x,k},a_{y,k})$ is significantly increased, thereby increasing the probability of correct detection while reducing false alarms due to stationary clutter.

After forming the target-focused subaperture images, the processing of this embodiment utilizes an algorithm that jointly estimates both moving and stationary scattering effects. Specifically, the focused scattering components of targets moving with the candidate motion parameters $(u_k,v_k,a_{x,k},a_{y,k})$ are stationary with regard to the subaperture index s. The defocused scattering component due to stationary clutter can be seen to drift with respect to the subaperture index s according to equations (27) and (28), but with the exact opposite direction. Here, location $(x_0, y_0)$ equals the mean location of the defocused stationary scattering energy over the extent of the subapertures. The subaperture drift of the defocused stationary clutter is exploited to reduce the effects of false alarms in attempting to detect targets moving with candidate motion parameters $(u_k,v_k,a_{x,k},a_{y,k})$. Consider the difference in the subaperture images between two adjacent subapertures in terms of the index s. Thus, examination of the defocused stationary scattering image intensities for adjacent subaperture images $g_{s+1,k}(x_m,y_n)$ and $g_{s,k}(x_m,y_n)$ reveals the following shifts in the down-range and cross-range components, respectively:

$$\delta_x = -\frac{k}{\xi_f}\{v_0 - \alpha_0\}(\Delta\varepsilon_s)^2, \tag{36}$$

$$\delta_y = -\frac{k}{\xi_f}\{u_0 + 2\{v_0 + \alpha_0\}(\Delta\varepsilon_s) + 3\beta_0(\Delta\varepsilon_s)^2\}. \tag{37}$$

Again, the scattering energy of targets moving with motion characterized by $(u_k,v_k,a_{x,k},a_{y,k})$ does not exhibit such drift with regard to the subaperture index s.

To exploit the different subaperture drift signatures of moving targets characterized by $(u_k,v_k,a_{x,k},a_{y,k})$ via the motion index k versus that of the stationary clutter, a measurement model of these effects may be utilized. Let $p(x_m,y_n)$ denote the ideal image of focused targets moving with motion parameters $(u_k,v_k,a_{x,k},a_{y,k})$, and let $q(x_m,y_n)$ denote the ideal image of the defocused stationary clutter. Then, one model of measured, target-focused, subaperture images obeys the system of equations:

$$g_{s,k}(x_m,y_n)=p(x_m,y_n)+q(x_m+s\delta_{x,k},y_n+s\delta_{y,k}) \tag{38}$$

with the subaperture index s incremented by unity in progressing from one subaperture to the next adjacent subaperture.

It is possible to extend the signal model of Equation (38) to a more general model that includes deterministic interference due to other movers. Such a more generic model would obey the equations:

$$g_{s,k}(x_m, y_n) = \sum_k q_k(x_m + s\delta_{x,k}, y_n + s\delta_{y,k}), \tag{39}$$

in terms of a set of motion fields $q_k(x,y)$, with the index k denoting the particular motion field. The field of defocused stationary clutter would be one of these terms in equation (39). One versed in the art could modify the analysis below in order to include these additional effects due to the interference of non-candidate movers when searching for movers having a particular set of candidate motion parameters. However, the majority of the received radar energy is due to stationary scatterers when measuring SAR image data. Thus, equation (38) is sufficient for most applications.

The systems of equations (38) are transformed to the frequency domain so that displacements in the image domain become phase factors in the frequency domain:

$$G_{s,k}(\xi_m,\eta_n)=P_k(\xi_m,\eta_n)+Q_k(\xi_m,\eta_n)\exp(j2\pi\{\xi_m\delta_x+\eta_n\delta_y\}s). \tag{40}$$

The frequency-domain equations (40) are linear in terms of the unknowns (i.e. $p_k(x,y)$ and $(q_k(x,y))$ and thus are inverted using standard techniques known to one of ordinary skill in the art to jointly estimate the contributions due to focused moving targets and defocused stationary clutter. This solution is simply based upon the joint pseudo-inverse of the forward problem for the case in which there are a greater number of subaperture images than there are motion models to be estimated (i.e. the case in which the number S of subaperture images in greater than 2).

The resulting frequency domain estimates of the images corresponding to targets moving with candidate motion parameters ($u_k, v_k, a_{x,k}, a_{y,k}$) and of the stationary clutter are jointly estimated to be the following:

$$\hat{P}_k(\xi_m, \eta_n) = \frac{A_k(\xi_m, \eta_n)S - B_k(\xi_m, \eta_n)C(\xi_m, \eta_n)}{S^2 - C^2(\xi_m, \eta_n)}, \quad (41)$$

$$\hat{Q}_k(\xi_m, \eta_n) = \frac{-A_k(\xi_m, \eta_n)C(\xi_m, \eta_n) + B_k(\xi_m, \eta_n)S}{S^2 - C^2(\xi_m, \eta_n)}, \quad (42)$$

in terms of the functions $$A_k(\xi_m, \eta_n) \equiv \sum_s G_{s,k}(\xi_m, \eta_n), \quad (43)$$

$$B_k(\xi_m, \eta_n) \equiv \sum_s G_{s,k}(\xi_m, \eta_n)\exp(-j2\pi\{\xi_m\delta_x + \eta_n\delta_y\}s), \quad (44)$$

$$C(\xi_m, \eta_n) \equiv \sum_s \exp(j2\pi\{\xi_m\delta_x + \eta_n\delta_y\}s), \quad (45)$$

with the summations in Eqs. (43)-(45) applied over the subaperture index s and the constant S denoting the total number of subaperture data sets used in these summations.

Finally, the two-dimensional inverse Fourier transforms of equations (41) and (42) are used to obtain the joint estimate of the focused moving targets $p_k(x_m, y_n)$ and the defocused stationary clutter $q_k(x_m, y_n)$:

$$\hat{p}_k(x_m, y_n) \leftrightarrow \hat{P}_k(\xi_m, \eta_n), \quad (46)$$

$$\hat{q}_k(x_m, y_n) \leftrightarrow \hat{Q}_k(\xi_m, \eta_n). \quad (47)$$

The solution for $p_k(x_m, y_n)$ and $q_k(x_m, y_n)$ as determined by equations (41)-(47) is not well-defined for spatial frequencies such that $\xi\delta_x + \eta\delta_y$ equals an integer, as shown by the denominators of equations (41) and (42) via equation (45). Well-defined solutions exist for spatial frequencies such that $\xi\delta_s + \eta\delta_y$ is not equal to an integer; however, this problem becomes ill-conditioned for some non-zero span of frequencies in the neighborhood of the locus where $\xi\delta_s + \eta\delta_y$ equals an integer for the realistic case of noisy estimates of the various subaperture images $g_{s,k}(x_m, y_n)$ resulting from noisy radar echo measurements. Thus, this solution tends to be sensitive to additive noise in the measured data.

One practical means for ameliorating this ill-conditioning problem is to apply an appropriate weighting function $W_k(\xi_m, \eta_n)$ to $P_k(\xi_m, \eta_n)$ and $Q_k(\xi_m, \eta_n)$ in equations (41) and (42) prior to applying the inverse Fourier transform of equations (46) and (47) to obtain the desired functions $p_k(x_m, y_n)$ and $q_k(x_m, y_n)$. Empirical analysis has revealed that the application of a two-dimensional "zero-forcing" window defined by $$W_k(\xi_m, \eta_n) \equiv \begin{cases} 1, & \text{if } S^2 - C^2(\xi_m, \eta_n) \geq W_{min} \\ 0, & \text{if } S^2 - C^2(\xi_m, \eta_n) < W_{min} \end{cases}, \quad (48)$$

with $W_{min}$ equal to some appropriate value. An analysis based on the signal-to-noise ratio indicates that the value of $W_{min}$ should be set so that the denominator $S^2 - C^2(\xi_m, \eta_n)$ of equations (41) and (42) does not vary over a greater span than does the signal-to-noise ratio. Thus, the value of $W_{min}$ can be set according to the following:

$$W_{min} \equiv \frac{\max\{W_k(\xi_m, \eta_n)\}}{\psi}, \quad (49)$$

with $\psi$ equal to the estimate of the peak signal-to-noise ratio in absolute (i.e. non-decibel) units. Further analysis has revealed that additional conditioning can be obtained by the application of a two-dimensional Hanning window $$W_{k,Hann}(\xi_m, \eta_n) \equiv \{4/3\}\{1 - \cos(2\pi\{\xi_m\delta_x + \eta_n\delta_y\})\} \quad (50)$$

over the entire span of both $\xi_m$ and $\eta_n$. In summary, one possible conditioning window is $$W_k(\xi_m, \eta_n) \equiv W_{k,zero}(\xi_m, \eta_n) W_{k,Hann}(\xi_m, \eta_n) \quad (51)$$

in terms of Equations (49) and (50). One versed in the art can examine the application of any number of known techniques for conditioning the system of equations given by Equations (41)-(47).

The ill-conditioning of the original system of equations can be mitigated by using the following estimates for the Fourier transforms of the desired functions $p_k(x_m, y_n)$ and $q_k(x_m, y_n)$, respectively:

$$\hat{P}_k(\xi_m, \eta_n) = W_k(\xi_m, \eta_n)\left\{\frac{A_k(\xi_m, \eta_n)S - B_k(\xi_m, \eta_n)C(\xi_m, \eta_n)}{S^2 - C^2(\xi_m, \eta_n)}\right\}, \quad (52)$$

$$\hat{Q}_k(\xi_m, \eta_n) = W_k(\xi_m, \eta_n)\left\{\frac{-A_k(\xi_m, \eta_n)C(\xi_m, \eta_n) + B_k(\xi_m, \eta_n)S}{S^2 - C^2(\xi_m, \eta_n)}\right\}. \quad (53)$$

The primary cost in using a weighting function for system conditioning is that the resulting estimates for the focused moving targets $p_k(x_m, y_n)$ and the stationary clutter $q_k(x_m, y_n)$ exhibit some loss in resolution. However, this slight loss of resolution is of little importance to the problem of detecting and imaging moving targets.

In attempting to separate the image of focused targets moving with motion index k from that of the defocused stationary clutter, it is useful to compute the following discrimination image:

$$\Lambda_k(x_m, y_n) \equiv \frac{|\hat{p}_k(x_m, y_n)|^2}{|\hat{q}_k(x_m, y_n)|^2}. \quad (54)$$

This function differentiates the effects of focused targets moving with motion index k from that of the defocused stationary clutter. In particular, the image $\Lambda_k(x_m, y_n)$ is expected to be greater than some constant $\Lambda_{min} > 1$ for spatial pixels for which the scattering intensities of the k-motion parameter targets are stronger than that due to the defocused stationary clutter, and this image is expected to be less than $\Lambda_{min}$ for pixels with stronger stationary scattering clutter.

To make a binary declaration (i.e. target present or target not present) of a moving target with motion index k, one approach under this embodiment of the invention is to require $\Lambda_k(x_m, y_n)$ to be greater than $\Lambda_{min}$ and that $p_k(x_m, y_n)$ be greater than some minimum energy threshold. This processing yields a binary target detection image for motion index k:

$$\Gamma_k(x_m, y_n) \equiv \{\Lambda_k(x_m, y_n) > \Lambda_{min}\} \& \{|\hat{p}_k(x_m, y_n)| > p_{min}\}. \quad (55)$$

This binary detection image can be used as an overlay on the original input image.

To obtain images of the actual moving targets, it is possible to use the $p_k(x_m, y_n)$ computed earlier in the processing to obtain an image overlay with slightly degraded resolution. As an alternative, it is possible use the estimates of the candidate motion parameters corresponding to the highest value of the MESAR discrimination image in equation (54) into the quadratic focus factors of equation (29) applied to the original full aperture data. Such processing can be used in order to obtain an image overlay of the moving targets with no degradation in resolution.

It should also be clarified that Equation (41) can be expressed in the generic form of Wiener filtering:

$$G = \Sigma AQ + N. \quad (56)$$

It is well-known to those versed in the art that such Wiener filtering techniques can offer improved results if the noise spectrum is non-uniform. However, in applying Wiener filtering for the current application, proper mitigation of the ill-conditioning due to the deterministic clutter is still required (e.g., Equation (51)). In addition, the increased computation time of applying Wiener filtering must be traded against that required in order to investigate different motion hypotheses.

The moving target detection and image reconstruction processes developed above are applied to simulated phase history data that contains contributions from both stationary scattering points and moving scattering points with the following results. FIG. 1a is a "truth" plot 100 showing an example containing eighteen stationary point scatterers, as denoted by the red circles 101. The location of three moving point scatterers are denoted by the curved lines, which begin at the green x's at the beginning of the simulate SAR measurements and end at the blue asterisks at the end of the measurements. Thus, the lengths of these lines indicates the true target speeds. The simulation represented in FIG. 1a includes point targets moving at various speeds and in various directions. The image powers of the stationary points were all chosen to be approximately 1 dB higher than that of the moving point targets. This presents a challenging scenario in which stationary clutter can interfere with the detection of the moving targets. The specific values of the truth target velocity and acceleration parameters $(u_k, v_k, a_{x,k}, a_{y,k})$ are given by (2, −10, 0.1, −0.2), (4, −2, −0.2, −0.1), and (−2, −6, 0.1, 0.1). In the analysis here and below, all velocities are given in meters/second and all accelerations are in meters/second/second. The components of the velocity and acceleration in the elevation direction (i.e., the z direction) are zero.

Figure 1B:
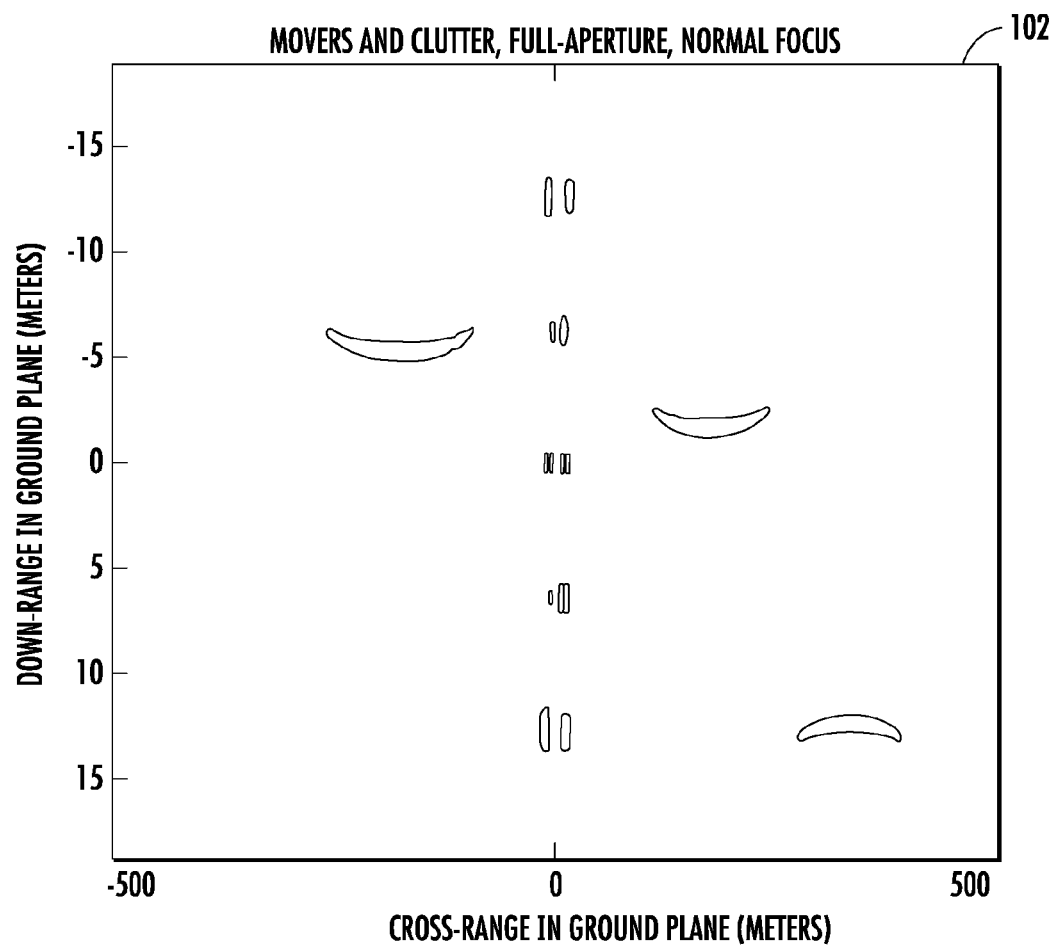
FIG. 1b illustrates a conventional SAR image corresponding to scattering points of FIG. 1a in one embodiment of the present invention.

The true values of the moving and stationary scattering centers were used to simulate the phase history measurements for a signal-to-noise ratio of 50 dB. The depression angle of the simulated collection was set equal to zero, and the squint angle was also set equal to zero. The simulated waveforms covered a frequency span of 9.75 GHz through 10.25 GHz, and the simulated aperture angles covered a span of −3 degrees through +3 degrees. To complete the preprocessing, these phase history measurements were resampled onto a Cartesian frequency-domain grid to yield frequency-domain data $G(\xi_m, \eta_n)$, with m=1, ..., M, and n=1, ..., $N_f$, which is the input data into the overall processing. These simulated data yield the conventional SAR image 102 shown in FIG. 1b, which shows that the stationary targets yield well-focused points and the moving targets yield various smeared energy contributions.

Figure 2A:
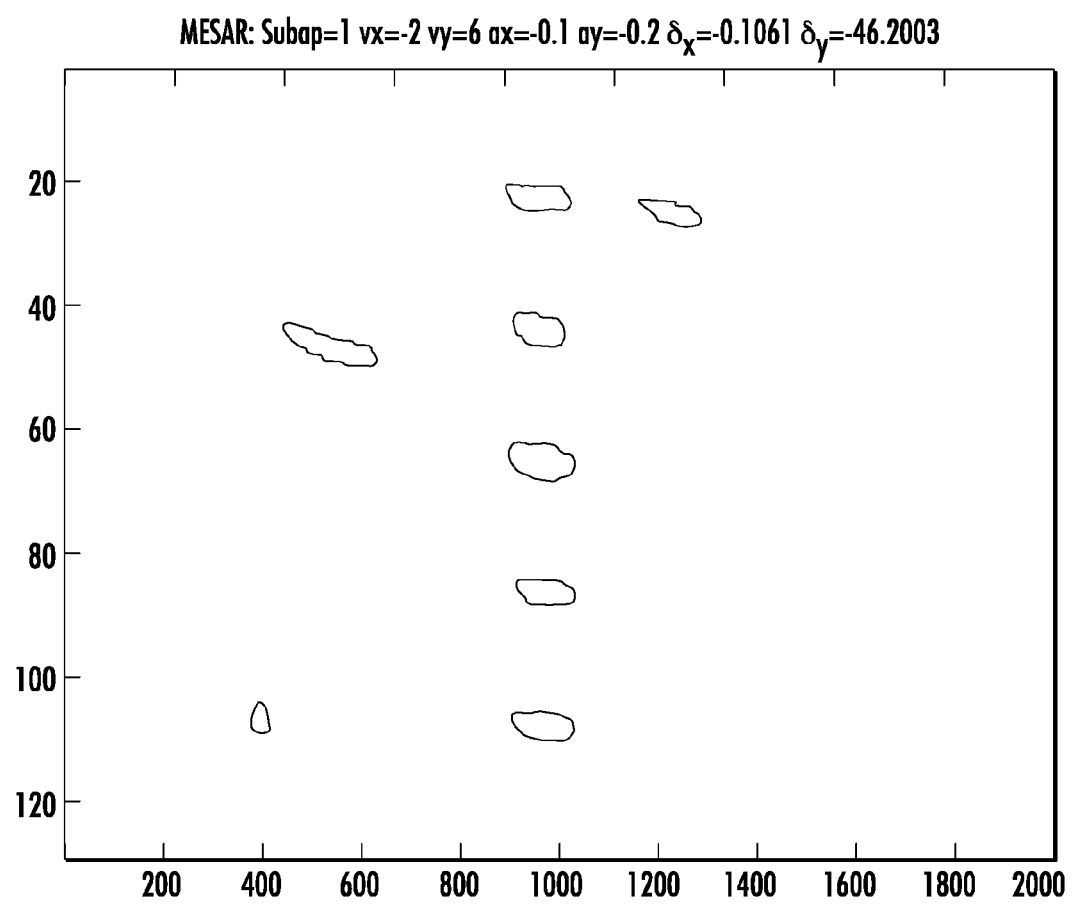
FIGS. 2a-2b illustrate target-focused images corresponding to scattering points of FIG. 1a according to one embodiment of the present invention.
Figure 2B:
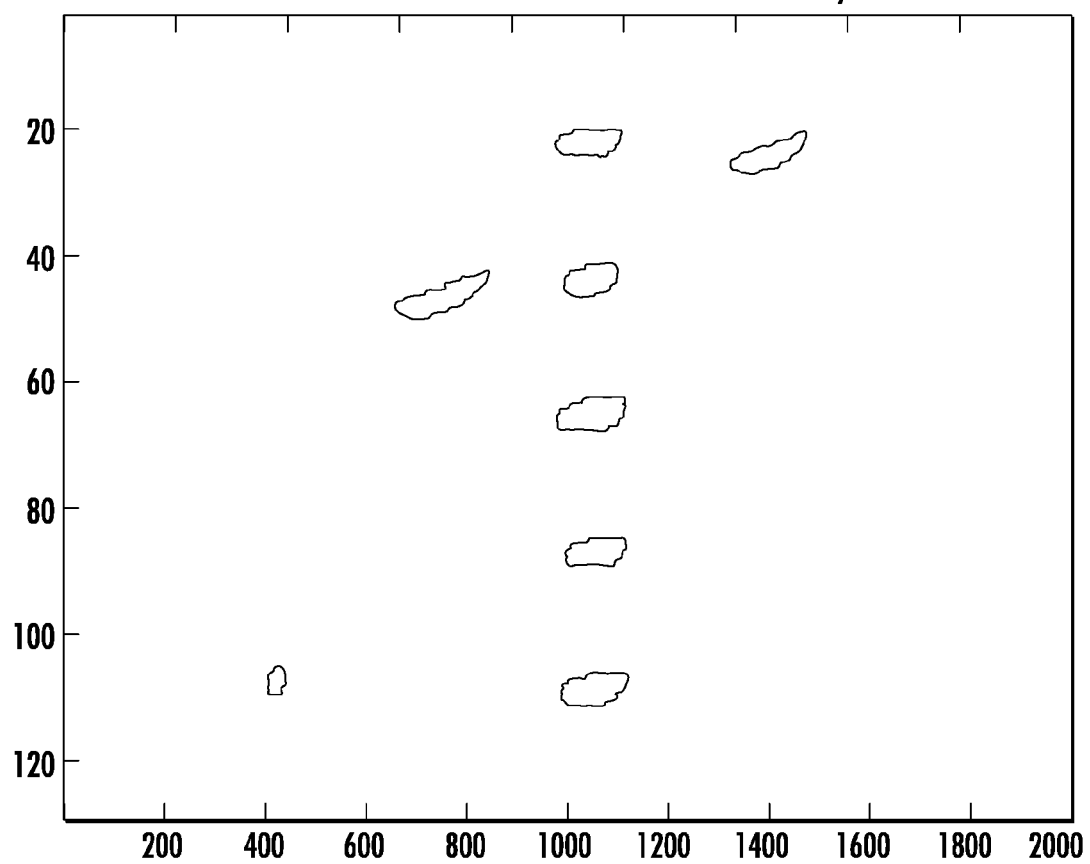
Figure 2C:
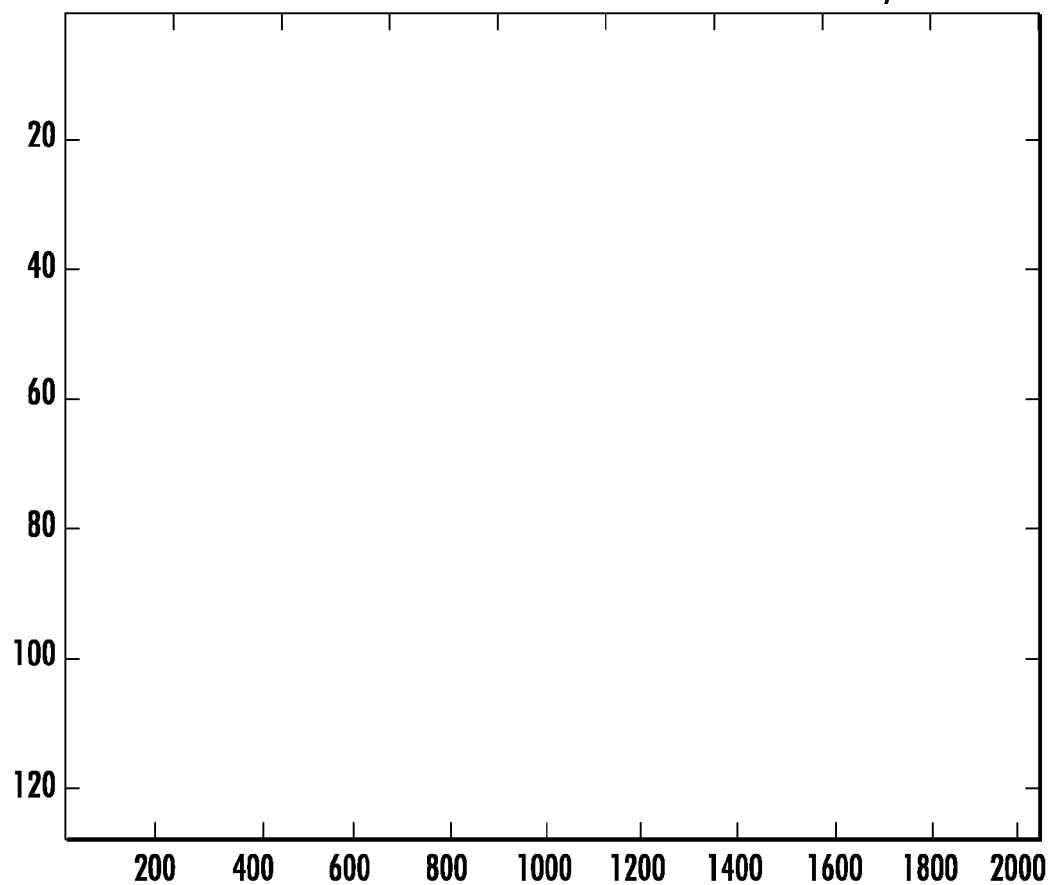
FIG. 2c illustrates a binary target detection mask corresponding to scattering points of FIG. 1a according to one embodiment of the present invention.

The processing is initiated based upon the full aperture frequency-domain data $G(\xi_m, \eta_n)$ m=1, ..., M, and n= 1, ..., $N_f$. The original full aperture is decomposed into a total of S=16 equally-spaced and overlapping subapertures, each having 50% of the sample points in the cross-range spatial frequency (i.e., N=$N_f$/2). A number of candidate sets of target velocity and acceleration parameters $(u_k, v_k, a_{x,k}, a_{y,k})$ is selected for analysis. First, we examine the results obtained when the candidate motion parameter set is not matched to the truth. FIG. 2a and FIG. 2b show examples of the first and last (#16) target-focused subaperture images corresponding to the motion parameters $(u_k, v_k, a_{x,k}, a_{y,k})$=(−2,6,−0.1,−0.2). FIGS. 2a and 2b show the expected relative shift in the defocused stationary clutter. FIG. 2c shows that the resulting binary mask $\Gamma_k(x_m, y_n)$ of equation (55) correctly yields no target detections of moving targets characterized by this set of motion parameters.

Figure 3A:
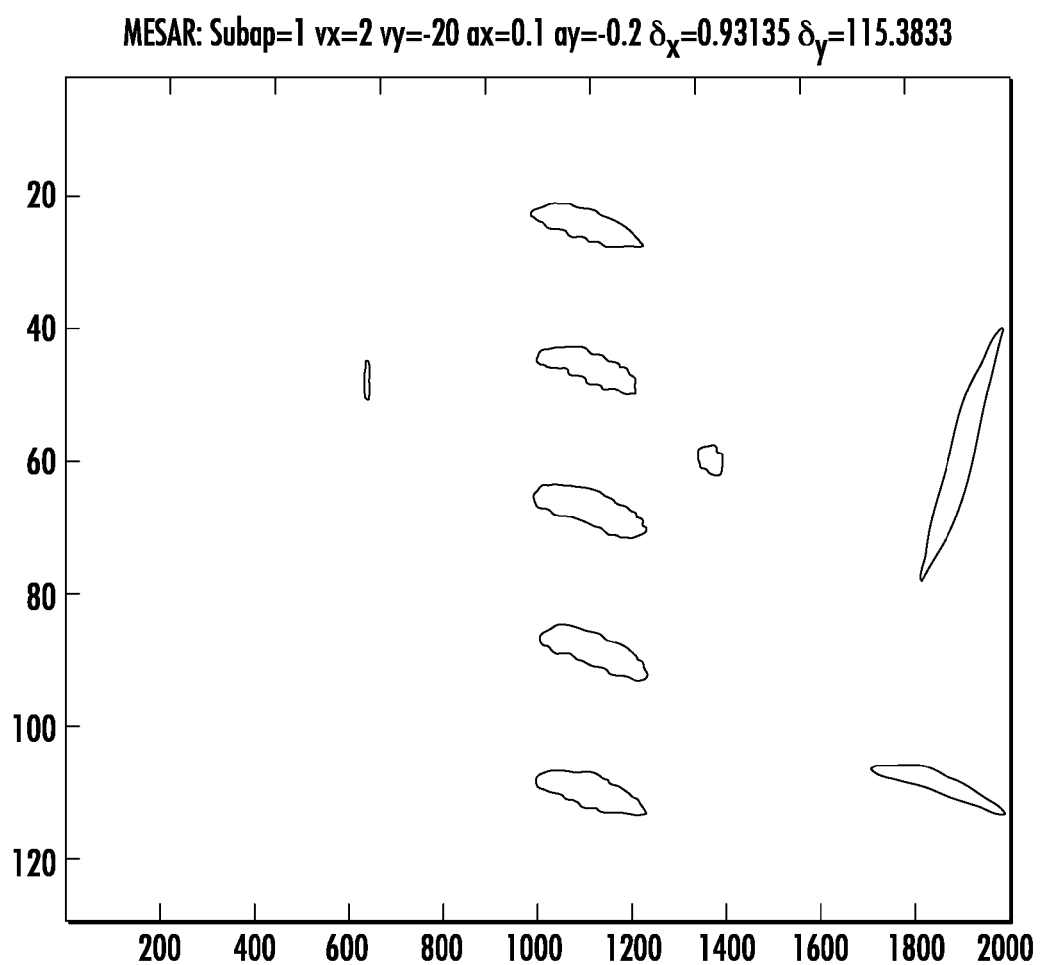
FIGS. 3a-3b illustrate target-focused images corresponding to scattering points of FIG. 1a according to one embodiment of the present invention.
Figure 3B:
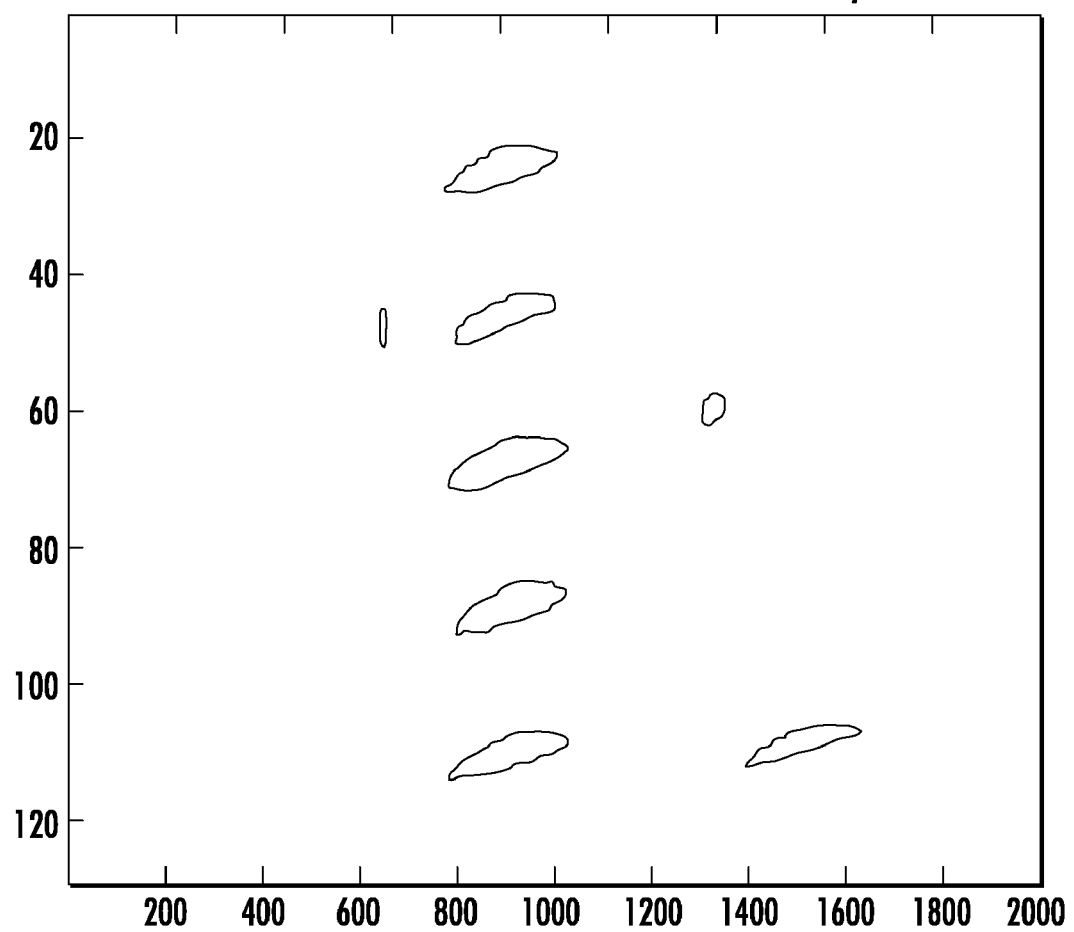
Figure 4:
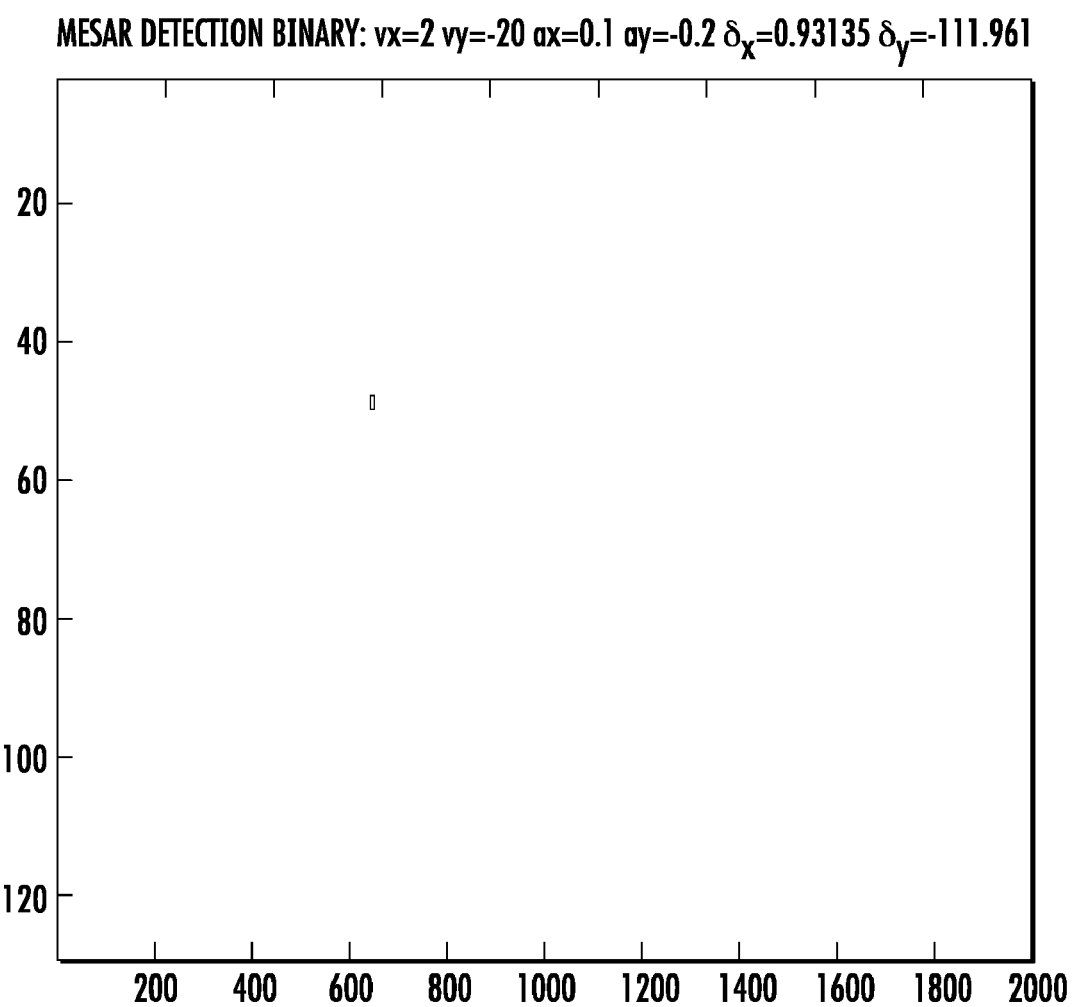
FIG. 4 illustrates a binary target detection mask corresponding to scattering points of FIG. 1a according to one embodiment of the present invention.
Figure 5:
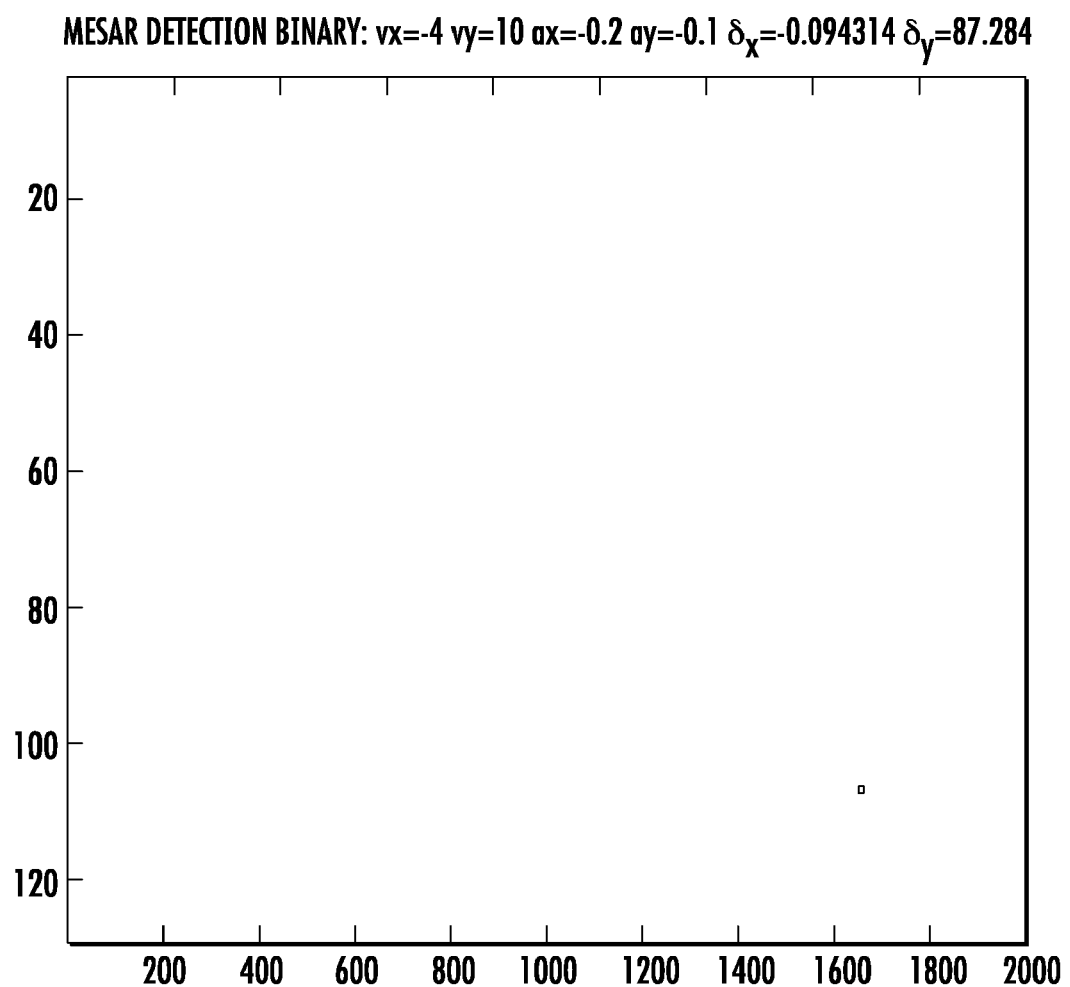
FIGS. 5-7 illustrate binary target detection masks corresponding to scattering points of FIG. 1a according to one embodiment of the present invention.
Figure 6:
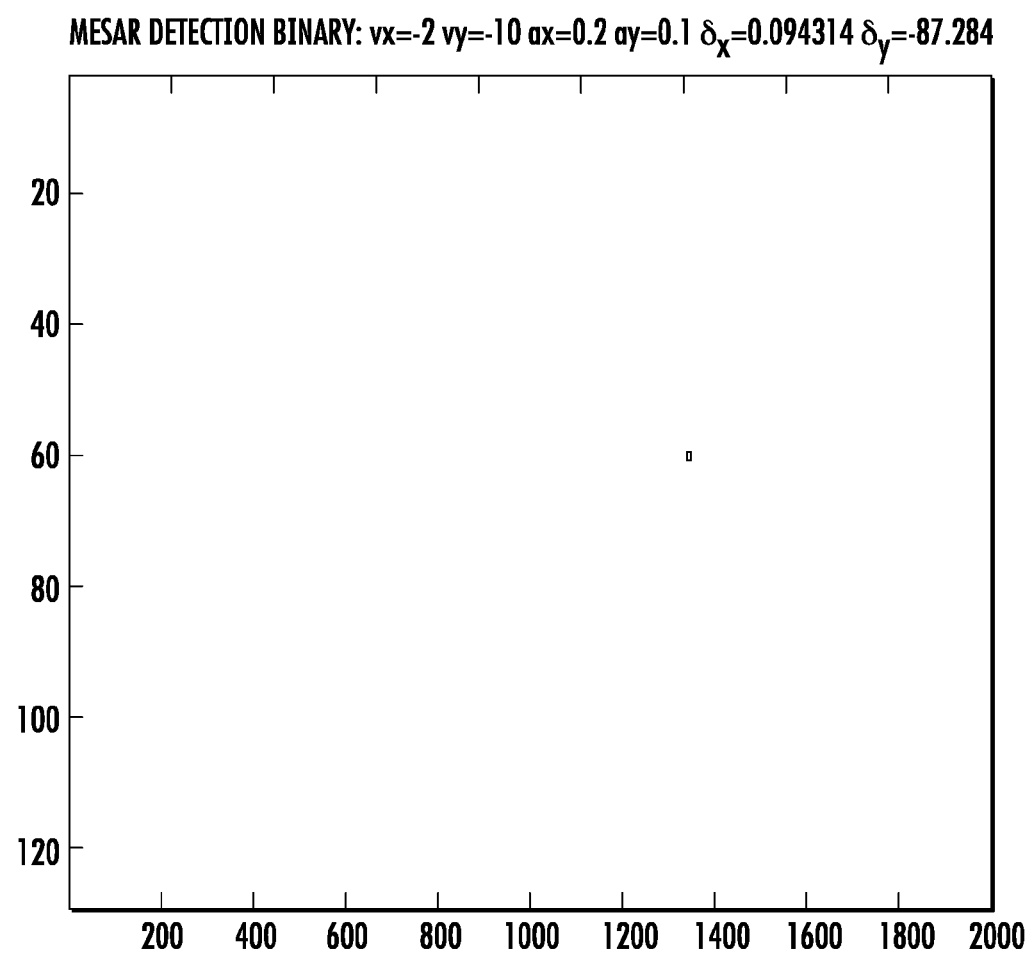
Figure 7:
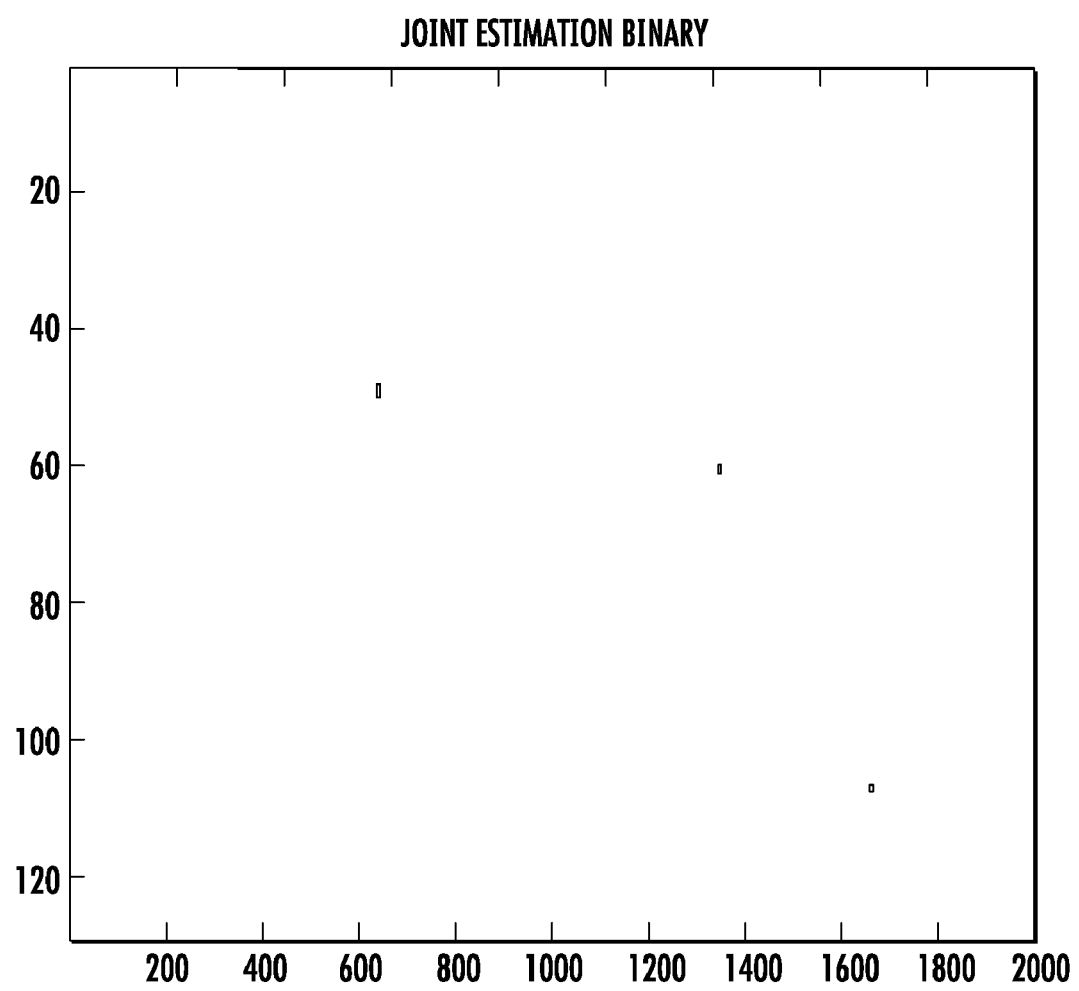

This same processing is applied to search for moving targets characterized by various values of the candidate motion parameters. FIGS. 3a, 3b, and 4 examine the particular case of $(u_k, v_k, a_{x,k}, a_{y,k})$=(2,−20,0.1,−0.2), which corresponds to one of the moving targets in the original simulated data. FIGS. 3a and 3b reveal the shift of the defocused stationary scattering energy in the first and last (#16) target-focused subaperture images. FIG. 4 shows that the resulting binary mask $\Gamma_k(x_m, y_n)$ for this parameter set correctly detects the true moving target. FIGS. 5-6 show the resulting binary masks for the other two correctly detected targets. FIG. 7 shows the final combined moving target detection mask images resulting from the binary "and" operation applied to all of the binary masks $\Gamma_k(x_m, y_n)$ for the different motion parameter sets $(u_k, v_k, a_{x,k}, a_{y,k})$. Thus, this simulation consisting of both moving targets and stationary clutter detected all three moving targets with no false alarms, for one particular setting of the energy threshold $p_{min}$ in equation (55).

The specific examples described above are not intended to be limiting. Alteration of the processes described above is contemplated by one skilled in the art for application of the MESAR processing to various types of reflection tomography data, including radar, sonar, and the like, for embodiments in which the transmitter/receiver locations move during the measurements of the reflected echoes, as with SAR, or the transmitter/receiver locations do not move, as with Inverse SAR (ISAR).

The invention claimed is:

1. A process for detecting a moving target and reconstructing a scene with a moving target from scattering data, said process comprising:
    collecting an image of a scene, the image containing scattering data from the scene representing
        (a) stationary scatterer reflection data and
        (b) moving scatterer reflection data;
    decomposing said scattering data into a plurality of subsets of scattering data;
    choosing a plurality of candidate motions;
    forming for each pairwise combination of each said subset of scattering data with each said candidate motion a target-focused subimage, wherein said target-focused subimage is focused according to said candidate motion;
    for each said candidate motion, using a plurality of said target-focused subimages focused according to said candidate motion to form joint balanced estimates of (1) a focused subimage containing only scatterers moving with said candidate motion and (2) a defocused image containing only stationary scatterers;
    for each said candidate motion using said estimate of the focused subimage containing only scatterers moving with said candidate motion and said estimate of the defocused image containing only stationary scatterers to make a binary decision with regard to the presence or absence of a target moving with said candidate motion.

2. The process according to claim 1, wherein the scattering data is two-dimensional, Cartesian-sampled, complex-valued, spatial frequency domain data.

3. The process according to claim 2, wherein one of the two dimensions is a cross-range dimension, and decomposing said scattering data into a plurality of subsets of scattering data is in the cross-range dimension.

4. The process according to claim 1, wherein each candidate motion comprises a plurality of components.

5. The process according to claim 1, wherein the image is collected using synthetic aperture radar.

6. The process according to claim 1, wherein the scattering data are collected using a co-located transmitter and receiver.

7. The process according to claim 1, wherein the scattering data are collected using inverse synthetic aperture radar.

8. The process according to claim 1, wherein the scattering data are collected using a method wherein transmitter or receiver locations are stationary during a measurement of a reflected echo.

9. The process according to claim 1, wherein the scattering data are collected for vehicle speed detection or monitoring.

10. The process according to claim 1, wherein the scattering data are collected based upon the general principles of reflection tomography.

11. The process according to claim 1, wherein the scattering data are collected for monitoring of blood flow using medical ultrasound technology.

12. The process according to claim 1, wherein an estimate of a moving entity includes two or more components of a velocity of the entity.

13. The process according to claim 12, wherein the estimate is of blood flow using medical ultrasound technology.

14. A system for detecting a moving target and reconstructing a scene with a moving target from scattering data, said system comprising:
   a radar for collecting an image of a scene, the image containing scattering data from the scene representing
   (a) stationary scatterer reflection data and
   (b) moving scatterer reflection data;
   wherein said scattering data is decomposed into a plurality of subsets of scattering data and a plurality of candidate motions is chosen;
   for each pairwise combination of each said subset of scattering data with each said candidate motion forming a target-focused subimage, wherein said target-focused subimage is focused according to said candidate motion;
   for each said candidate motion, using a plurality of said target-focused subimages focused according to said candidate motion to form joint balanced estimates of (1) a focused subimage containing only scatterers moving with said candidate motion and (2) a defocused image containing only stationary scatterers;
   for each said candidate motion using said estimate of the focused subimage containing only scatterers moving with said candidate motion and said estimate of the defocused image containing only stationary scatterers to make a binary decision with regard to the presence or absence of a target moving with said candidate motion.

15. The system according to claim 14 wherein the scattering data is two-dimensional, Cartesian-sampled, complex-valued, spatial frequency domain data.

16. The system according to claim 15, wherein one of the two dimensions is a cross-range dimension, and decomposing said scattering data into a plurality of subsets of scattering data is in the cross-range dimension.

17. The system according to claim 14, wherein each candidate motion comprises a plurality of components.

18. The system according to claim 14, wherein the radar is a synthetic aperture radar.

19. The system according to claim 14, wherein the scattering data is collected using a co-located transmitter and receiver.

20. The system according to claim 14, wherein the radar is an inverse synthetic aperture radar.

* * * * *